May 19, 1942.　　F. W. JOHNSON　　2,283,605
VALVE
Filed Dec. 16, 1940
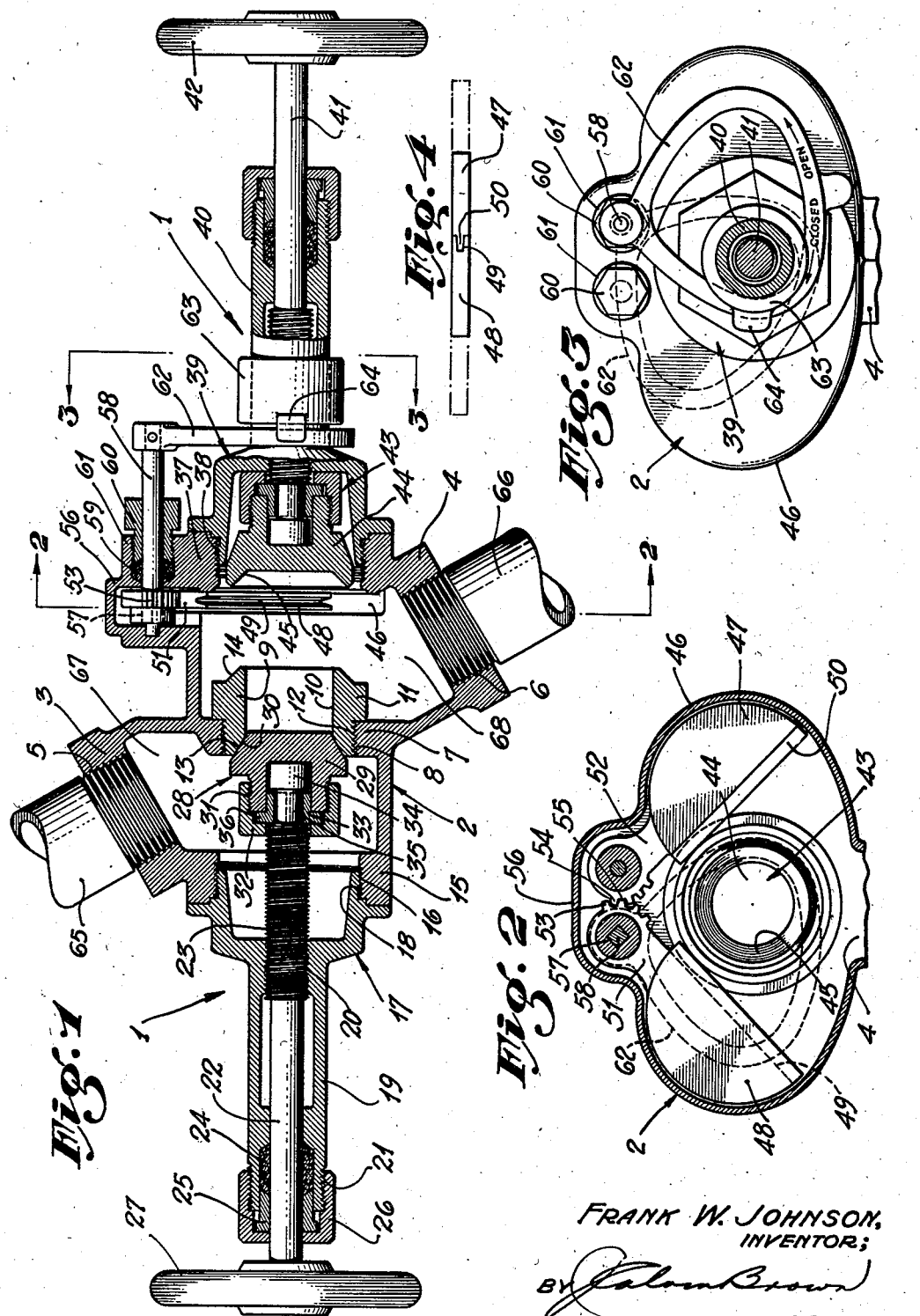
FRANK W. JOHNSON,
INVENTOR;
BY
ATTORNEY.

Patented May 19, 1942

2,283,605

UNITED STATES PATENT OFFICE 2,283,605

VALVE

Frank W. Johnson, South Pasadena, Calif.

Application December 16, 1940, Serial No. 370,330

1 Claim. (Cl. 277—46)

This invention relates to valves, and particularly to a type of valve controlling hot acid steam under high pressures.

It has been found in actual practice that valves which control passage of hot acid steam wear away quickly, particularly if there is any abrasive material in the steam. Not only do the valves themselves deteriorate, but the valve seats become pitted so that the valves do not close properly. Hence, valves operating under high pressures must be renewed frequently and constantly watched, otherwise failure occurs.

The present invention has for an object a valve of long life and one wherein the valve is protected from hot acid steam when the valve is open.

Another object is the provision of a valve structure wherein the seat is so arranged as to not readily be cut away.

Another object consists in a valve structure wherein the valve seat may be pitted without, however, directly affecting proper seating and closing action of the valve to said seat.

In the practice of my invention, I have so arranged the inlet and outlet openings of a valve casing that a substantially straight flow path is afforded therebetween. Such deviation as occurs is through a valve seat member so arranged that two valves are adapted to be closed thereagainst or opened. In one instance, and on the intake side of the casing, the valve seat is provided with an internal taper and the outlet end of the valve is provided with an externally tapered seat. Thus passage of hot acid steam under pressure does not appreciably affect either valve seat. In both instances, the valve members are movable out of the flow path of the steam and one valve is protected from contact with the steam when the valve is open.

Other objects of the invention consist of a valve for the purpose stated which is inexpensive in cost of manufacture, of few parts, easily operated, and generally superior in point of durability and long life to valves now known to the inventor.

With the above mentioned and other objects in view, the invention consists in the novel and useful provision, formation, construction, association, and relative arrangement of parts, members and features, all as shown in certain embodiments in the accompanying drawing, described generally, and more particularly pointed out in the claim.

In the drawing:

Figure 1 is a longitudinal sectional view of the valve and associated mechanism, Figure 2 is a sectional view on the line 2—2 of Figure 1, Figure 3 is a sectional view on the line 3—3 of Figure 1, and, Figure 4 is a detail of the member for protecting one of the valve elements.

Referring now with particularity to the drawing, the improved valve structure is designated as an entirety by the numeral 1, and wherein 2 is a valve body or casing provided with an inlet port 3 and an outlet port 4. The inlet and outlet ports are screw-threaded at 5 and 6, respectively, it being noted that the axis of said two ports is in alignment. The casing is internally provided with an annular flange 7, screw-threaded at 8, to accommodate a valve seat member 9. The valve seat member has a central bore 10, an external flange 11, and a screw-threaded portion 12. The threads 12 are adapted to cooperate with the threads 8, the flange 11 acting as a stop. The valve member 9 is provided with an internally tapered valve seat 13 and with an externally tapered valve seat 14. The casing is enlarged at 15, and internally threaded at 16, to accommodate a bonnet 17 threaded at 18 for cooperation with the threads 16. This bonnet includes an elongated part 19, which is threaded at 20 and externally threaded at 21. A valve stem 22 is passed through the elongated part 19, the stem being enlarged as to diameter and threaded at 23 for cooperation with the threads 20. The stem is passed through a packing 24 held in place by a gland nut 25, the gland nut in turn being held by a cap nut 26 secured to threads 21. The outer end of the stem 22 carries a hand wheel 27. Rotation of the hand wheel rotates the stem and causes travel thereof due to the threaded engagement with the bonnet.

The inner end of the stem carries a valve assembly 28, which includes the valve 29, provided with a tapered surface 30 and a reduced diameter threaded portion 31, which has threaded engagement with a cap nut 32. This cap nut holds in place a member 33 for holding the valve assembly to the stem. The stem is provided with a head 34 with a reduced diameter portion between said head and the screw-threaded portion of the stem, as shown at 35. The member 33 is carried on the reduced diameter portion 35 and has a flange 36 included between the cap nut and an end of the valve. In this manner, the valve assembly is held to the stem and so that the stem may be rotated without the valve turning when the valve is seated.

The casing is enlarged at 37 and internally screw-threaded at 38 to accommodate the bonnet 39. An extension 40, identical with the extension 19, has passed therethrough a valve stem 41 provided at its outer end with a hand wheel 42, the valve stem carrying at its inner end a valve assembly 43. As this valve assembly is secured to the valve stem in the same manner that the other valve member is secured to its stem, the construction will not be detailed, nor will the construction be detailed as to the cap and gland nut surrounding the stem 41.

The valve 44 of the valve assembly is provided with an internally tapered seat 45 to cooperate with the externally tapered seat 14. It is noted that the two valves are in axial alignment, as are likewise the stems 22 and 41. The casing is enlarged transversely at the zone 46 (see Figure 2), to internally accommodate a pair of segmental shutters 47 and 48. One shutter is provided with a groove 49 and the other shutter with a tongue 50. Each shutter is provided with an arm 51 and 52 carrying gears 53 and 54, the teeth of which intermesh, as shown at 55. The casing is enlarged at 56 to accommodate the gears, and the gear 54 is mounted on a stud shaft having bearings in the enlarged portion of the casing, while the other gear is carried on a squared end 57 of a shaft 58. This shaft is passed through a stuffing gland 59 and a gland nut 60, the nut being secured to enlargement 61 of the casing part 56. The outer end of the shaft 58 has a lever 62 secured thereto. This lever is of the ring type and is adapted to have the extension 40 passed therethrough (see Figure 3). The rocking of this lever causes approach or separation of the segmental shutters. For instance, when the lever is in the position shown in Figure 3, the shutters are opened forwardly of the valve 44.

A sleeve 63 is slidable upon the extension 40 and carries a lug 64. This sleeve, when moved to the position shown in Figure 1, will prevent the lever 62 from being rocked to a closed position, and when rocked to an open position, the lug of the sleeve may engage the lever to hold the lever against movement.

The operation, uses and advantages of the invention are as follows:

If we assume that a pipe 65 is secured to the threads 5 and leads to a source of hot acid steam under high pressure, and that a pipe 66 is secured to the threads 6, which provides the outlet pipe, the valve 28 would remain seated until the valve 44 was moved within its bonnet 39 and the segmental shutters 47 and 48 closed as, for instance, illustrated in Figure 4, whereupon the valve 28 would be opened in the usual manner by turning the hand wheel 27. The hot acid steam would then flow within the valve casing, and particularly into the inlet chamber portion 67 through the opening 10 of the valve seat member, thence into outlet chamber portion 68 through pipe 66. It will be noted that in the passage of the fluid, the valve 28 is substantially out of contact with the steam, in that the said valve would be withdrawn into the bonnet 17. The fluid will contact, in its passage through the valve, with the tapered seat 13 but be substantially out of contact so far as rapid flow of the fluid is concerned with the tapered external seat 14. It is, of course, realized that the fluid will possibly surround the seat 14, but the seat is out of the direct flow path. It has been found that the valve seat 13 is not appreciably affected by the passage of fluid through the opening 10, and the seat 14 is not affected at all. However, it is necessary to protect the valve 44 from contact with the steam, which would rapidly cut it away and render the valve useless after a short period of time. By providing the pair of shutters 47 and 48, the shutters may be closed across the valve and protect the same from impingement thereon by the fluid. When it is desired to stop the flow of fluid from inlet to outlet, the valve 28 is first closed, whereupon the lever 62 may be moved to open the shutters to the position shown in Figure 2, whereupon valve 44 may be closed against the seat 14.

The present invention is adaptable to many types of fluid other than hot acid steam. The device is adapted to handle any fluid operating under high pressure. To this end, it has been found best to utilize two valves. When the fluid enters the chamber 67, its path is diverted in moving into chamber 68, the valves being open. The valve seat member to an extent directs the flow path, and for this reason, the shutters are provided to protect the valve 44. The valve 44 would ordinarily be the first valve to be cut away and rendered useless, due to constant impingement thereon of the fluid. However, by providing the two-valve structure wherein one valve is closed prior to moving the shutters to close the second valve, a structure results wherein long life for both valves results, and constant assurance that the fluid under high pressure is effectively shut off in its flow, and without leakage.

I claim:

A device of the character disclosed, including a casing having inlet and outlet portions and a partition wall within the casing between said portions, a valve seat carried by said partition, a bonnet secured to said casing, a pair of segmental shutters within the casing on the outlet side thereof, intermeshing gears carried by said shutters, a shaft for actuating said gears to close or separate said segmental shutters, a swing lever carried by said shaft, and a sleeve slidably movable relative to said bonnet for engaging said swing lever to hold said swing lever to position the segmental shutters open or closed, and a valve protected against fluid impact when the shutters are closed and allowed to seat against said valve seat member when the shutters are open.

FRANK W. JOHNSON.